United States Patent
Thommes et al.

(10) Patent No.: US 7,055,228 B2
(45) Date of Patent: Jun. 6, 2006

(54) DEVICE FOR MOUNTING SEALING STRIPS ON VEHICLE DOORS

(75) Inventors: Lothar Thommes, Matzerath (DE); Bernhard Kohlen, Ingendorf (DE); Klaus Grohmann, Hersdorf (DE)

(73) Assignee: Grohmann Engineering GmbH, Prüm (DE)

( * ) Notice: Subject to any disclaimer, the term of this patent is extended or adjusted under 35 U.S.C. 154(b) by 151 days.

(21) Appl. No.: 10/487,725

(22) PCT Filed: Jul. 2, 2002

(86) PCT No.: PCT/EP02/08117

§ 371 (c)(1),
(2), (4) Date: Feb. 27, 2004

(87) PCT Pub. No.: WO03/018250

PCT Pub. Date: Mar. 6, 2003

(65) Prior Publication Data

US 2004/0211044 A1 Oct. 28, 2004

(30) Foreign Application Priority Data

Aug. 30, 2001 (DE) ................. 101 42 131

(51) Int. Cl.
*B23P 19/02* (2006.01)
(52) U.S. Cl. .......................... 29/235
(58) Field of Classification Search ............... 269/266; 29/235, 281.1, 281.5
See application file for complete search history.

(56) References Cited

U.S. PATENT DOCUMENTS

| 4,653,166 A | 3/1987 | Bright |
| 5,121,532 A | 6/1992 | Massie |
| 6,554,040 B1 | 4/2003 | Cueff et al. |

FOREIGN PATENT DOCUMENTS

| DE | 36 38 176 | 5/1988 |
| DE | 198 37 508 | 2/2000 |
| FR | 2 641 746 | 7/1990 |

*Primary Examiner*—Robert C. Watson
(74) *Attorney, Agent, or Firm*—Cohen, Pontani, Lieberman & Pavane

(57) ABSTRACT

At least one installation plate is mounted on a base frame, every installation plate having at least one movable plate segment and means for changing the position of every movable plate segment. In order to exactly position the sealing strip to be bonded relative to the installation surface of the vehicle door, every movable plate segment is associated with a reference plunger that is mounted on the base frame so as to be displaceable in the axial direction. The reference plunger extends from the base frame in the direction of the movable plate segment and can be locked relative to the base frame. The reference plunger has on one end an adjustable cam that can be brought into the released from engagement with the vehicle part. At a distance from the earn projection, the reference plunger is provided with a stationary stop against which the associated plate segment can be moved.

8 Claims, 2 Drawing Sheets

DEVICE FOR MOUNTING SEALING STRIPS ON VEHICLE DOORS

PRIORITY CLAIM

This is a U.S. national stage of international application No. PCT/EP02/08117, filed on Jul. 2, 2002. Priority is claimed under 35 U.S.C. §119(a) and under 35 U.S.C. § 365(b) from German Application No. 101 42 131.1, filed on Aug. 30, 2001.

BACKGROUND OF THE INVENTION

1. Field of the Invention

The invention concerns a device for installing sealing strips on vehicle doors, which comprises a base frame, on which at least one installation plate is mounted, wherein each installation plate has at least one plate segment that is stationary with respect to the base frame and at least one movable plate segment and means for changing the position of each movable plate segment.

2. Description of the Related Art

Devices of this type with installation plates are known in the state of the art. The installation plates, which are usually arranged in pairs, are used for the automated bonding of a door seal to a bonding surface extending along the uneven edge of a vehicle door. For this purpose, the installation plate is divided into several upper, movable segments and one lower, stationary segment, which are connected by hinges. The movable segments are located above the lower edge of the window of the door and can be adjusted to fit the individual shape of the door that is to receive the sealing strip. A large number of holders are mounted on the installation plate and arranged to follow the shape of the sealing strip to be installed. The installation plates are normally completely integrated into the automated assembly line.

Problems with the automated assembly arise from the fact that, due to production-related tolerances, there are variations in the position and geometry of the upper region of the door where the window frame is located. These deviations, which can amount to several mm and cannot be compensated until the subsequent stages of manufacture, can lead to problems in the automated installation of the sealing strips on the doors. In the past, efforts have been made to compensate for the deviations by increasing the pressure with which the installation plate presses the sealing strip against the edge of the door. If the deviation is large enough, this measure will not be successful, and the sealing strip will not be bonded correctly to the intended bonding region of the door. This results in the need for undesired reworking, which interferes with the automated manufacturing process.

In addition, DE 198 37 508 A1 describes an installation device that has a two-part installation frame, the shape of which is adapted to the vehicle door. The two adjacent parts can be moved slightly relative to each other, perpendicularly to a separating line, in the plane of the installation frame. The distance between the parts is increased so that the frame, in which the tubular seal has been inserted, can be placed more easily on the door.

SUMMARY OF THE INVENTION

Proceeding from this state of the art, the goal of the invention is to create a device of the aforementioned type, which guarantees the exact positioning of the sealing strip to be bonded with respect to the bonding surface of the vehicle door.

The solution to this problem is based on the idea of determining any tolerances that may be present in the position of the upper door region relative to the lower door region by means of a gage assigned to each movable plate segment, whereupon each movable segment is then automatically adjusted as a function of the detected tolerance before the sealing strip is installed.

In particular, the goal of the invention is achieved with a device of the type mentioned above in that:

each plate segment is associated with a reference plunger, which is mounted on the base frame with freedom of axial movement, where this plunger projects from the base frame toward the plate segment and can be locked in position relative to the base frame; in that one end of the reference plunger has an adjustable projection, which can be brought into contact with, and released from, the vehicle component, and in that a stationary stop, against which the associated plate segment can be moved, is mounted on the reference plunger some distance from the projection.

In the engaged position, the projections of the reference plungers are in contact with suitable reference points in the upper door region. These points may be located on both the inside and the outside of the door edge. The reference plunger is preferably locked in place in its active position by a pneumatically operated clamping device.

An advantageous method of operating the device for installing sealing strips is characterized by the following features:

the entire device is positioned so that stationary plate segment and the vehicle component are separated from each other by a distance D, the distance D being selected so that the projection of the spring-loaded, unlocked reference plunger of each movable plate segment comes to rest against the vehicle component;

each reference plunger is then locked in position relative to the base frame, and each movable plate segment is moved against the stationary stop of the reference plunger; and each projection in contact with the vehicle component is released.

This method of operating the device guarantees that the stationary segment and all of the movable segments of the installation plate are the same distance away from the bonding surface. The entire device is then moved towards the door, and the sealing strip can be installed in the correct position. To this end, the device for installing sealing strips is moved towards the vehicle component until the sealing strip rests on the bonding surface.

DETAILED DESCRIPTION OF THE PRESENTLY PREFERRED EMBODIMENTS

Figure 1:
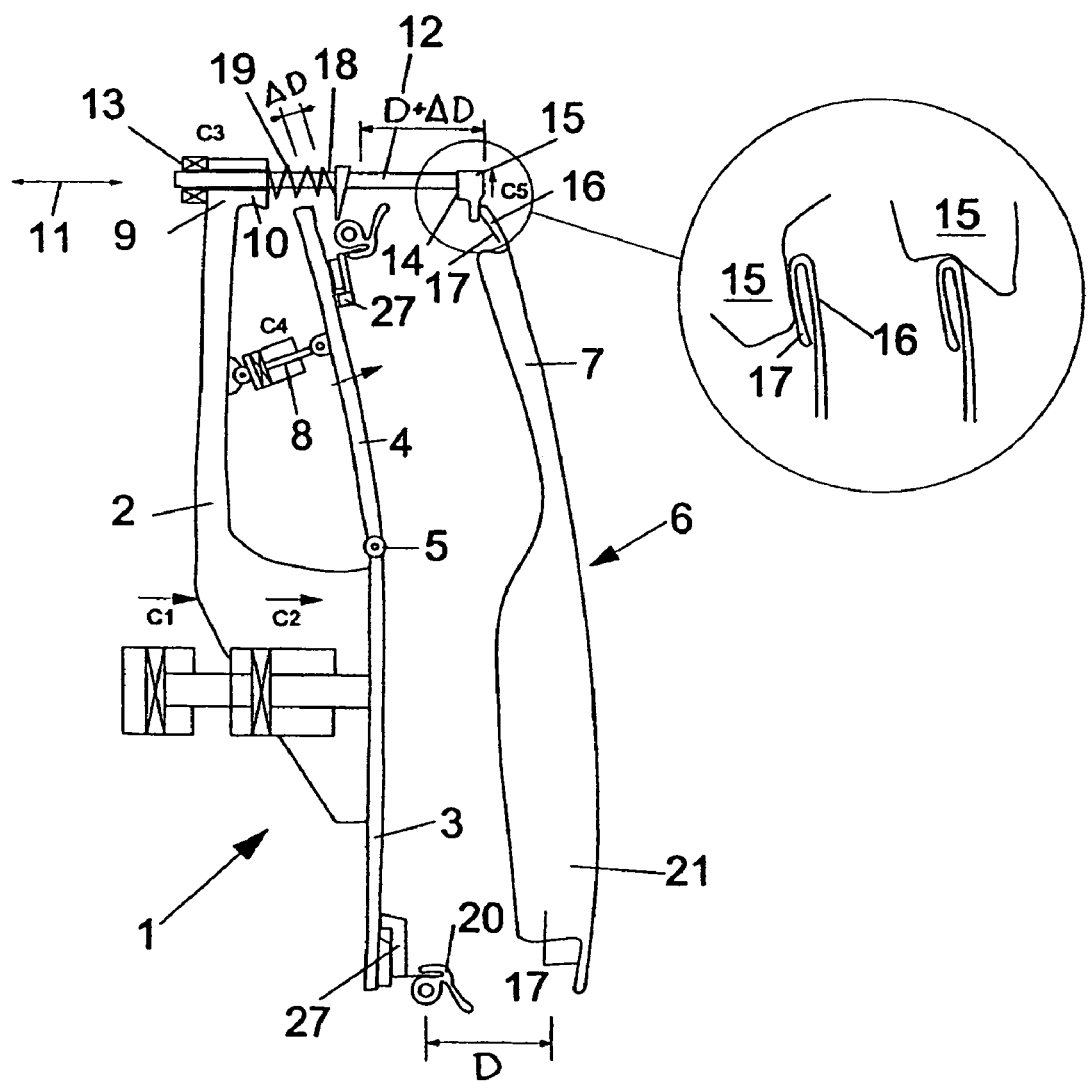
FIG. 1 shows a schematic cross section of the device according to the invention.

The device 1 for installing sealing strips on the bonding surfaces of a vehicle door 6 consists of a base frame 2, on which an installation plate is mounted. The installation plate has a plate segment 3 that is stationary relative to the base frame 2 and a movable plate segment 4, which is hinged to the stationary plate segment 3 by a joint 5 and conforms to the shape of the upper door region 7. A large number of holders 27 are mounted on the installation plate and are arranged to follow the shape of the sealing strip 20 to be installed. A hydraulically operated cylinder 8 is installed between the base frame 2 and the movable plate segment 4 to swing the plate segment 4 around the joint 5.

A sleeve 10 is provided at the upper edge 9 of the base frame 2 to guide a reference plunger 12 assigned to the plate segment 4 in the axial direction 11. The reference plunger 12 projects perpendicularly from the surface of the base frame 2 toward the movable plate segment 4 and the door 6. The reference plunger 12 is aligned with the contour of the door 6 with a slight outward displacement, so that the reference plunger 12 does not interfere with the installation of the sealing strip 20. The reference plunger 12 can be locked in place relative to the base frame 2 by a pneumatically operated clamping device 13.

One end 14 of the reference plunger 12 has a cam 15 that can be rotated around the axis 11. In the operating position of the device illustrated in FIG. 1, the cam 15 is already in contact with the upper door region 16 and can be released from such contact by turning it. In the engaged position, the projection can rest either from the inside against the bonding surface 17 for the sealing strip or from the outside against the upper door region 16.

A stationary stop 18 is mounted on the reference plunger 12 some distance from the projection 15, and the associated plate segment 4 can be moved against the stationary stop 18 by the cylinder 8. The distance between the stationary stop 18 and the projection 15 is established by the design in such a way that, when the movable plate segment 4 is resting against the stationary stop, the distance between the bonding region 17 and the sealing strip to be installed is the same in both the upper and lower door regions 7, 21. A spiral spring 19 that surrounds the reference plunger 12 is located between the stationary stop 18 and the sleeve 10. The reference plunger 12 can move against the tension of the spiral spring 19 toward the base frame 2 when the clamping device 13 is released.

The device according to the invention is operated as follows to achieve optimum adaptation of the installation plate to the geometry of the door, which varies slightly from one to another, especially in the region of the window frame, during the continuous manufacturing process:

The entire device 1 is first positioned so that the stationary plate segment 3 and the vehicle door 6 are separated from each other by the distance D. If the device 1 is moved by the distance D toward the vehicle door 6, the sealing strip 20 to be bonded will lie on the bonding region 17 in the lower region 21 of the door 6. The distance D must also be determined in such a way that the projection 15 of the reference plunger 12 can come to rest either on the bonding surface 17 for the sealing strip 20 from the inside or on the upper door region 16 from the outside.

After the device 1 has been positioned at the distance D, the reference plunger 12 is locked in place relative to the base frame 2 by the clamping mechanism 13. The cylinder 8 is then used to move the plate segment 4 by the distance ΔD against the stationary stop 18 of the reference plunger 12, and the projection 15 resting on the vehicle door 6 is disengaged by turning it until it points upward. Finally, the device 1 for installing the sealing strip 20 is moved toward the vehicle door 6 by the distance D, so that the sealing strip 20 comes to rest with a precise fit in both the lower and the upper regions of the door, where it is bonded.

The method described above is repeated for each sealing strip 20 to be installed on a door as part of a mass production program.

Figure 2:
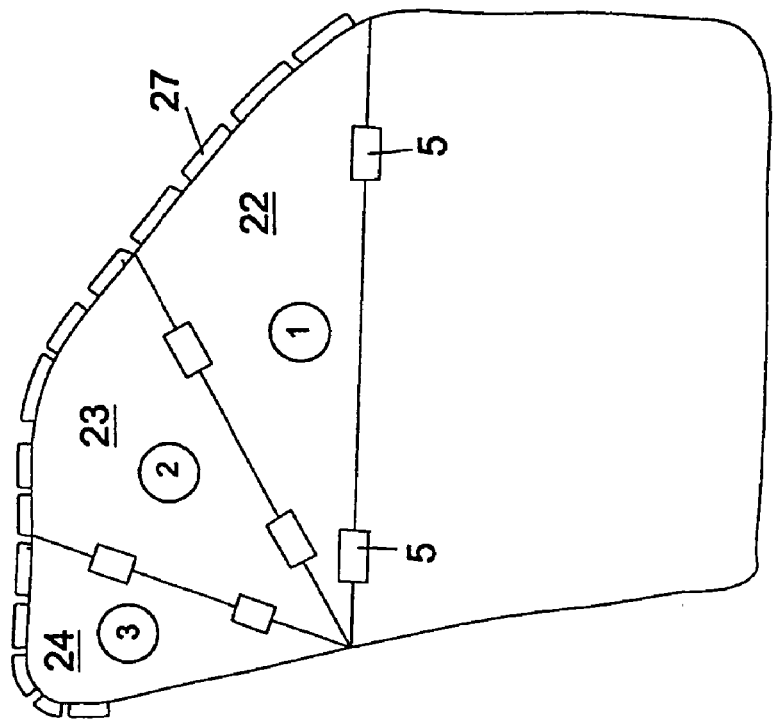
FIG. 2 shows a schematic view, from the side, of an exemplary embodiment of an installation plate for use in a device of the invention with several movable segments.

Of course, the method described above can be carried out not only with installation plates with only one movable segment 4, but also with installation plates that have, for example, three movable segments 22, 23, 24 in the upper region 7 of the door 6. Installation plates of this type are necessary especially for deeply recessed doors. As FIG. 2 shows, only the lower movable segment 22 is directly hinged to the stationary segment 3 assigned to the lower door region 21. Each of the other two movable segments 23, 24 is hinged only to the movable segment 22, 23 adjacent to it.

Figure 3:
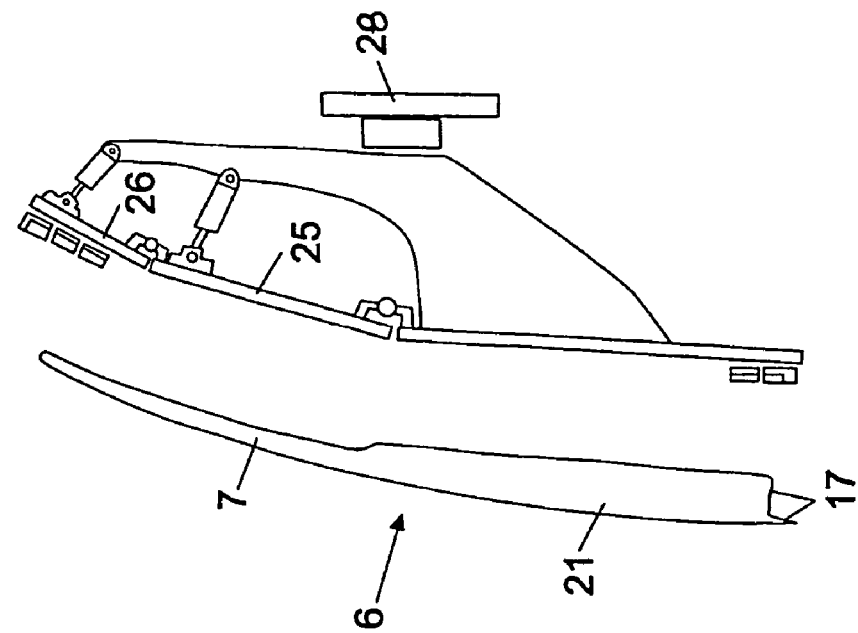
FIG. 3 shows a schematic cross section of another exemplary embodiment of an installation plate for use in a device according to the invention with two movable segments.

FIG. 3 shows an end view of another embodiment of an installation plate with several movable segments. In both FIG. 2 and FIG. 3, the reference plungers 12 associated with the various movable plate segments have been omitted for the sake of clarity. Furthermore, FIG. 3 shows a spherical mount 28 as an example of how the inventive device can be attached to a movable arm.

What is claimed is:

1. An apparatus for installing sealing strips on bonding surfaces of vehicle components, the apparatus comprising:
   a base frame;
   a stationary plate segment which is stationary with respect to said base frame;
   at least one movable plate segment which is movable with respect to said base frame;
   a reference plunger associated with each said movable plate segment, each said plunger being mounted on the base frame and projecting from the base frame toward the associated movable plate segment, each said plunger being axially movable with respect to said base frame and being lockable against movement relative to the base frame, each said plunger having an end with a projection which can make contact with and be released from the vehicle component; and
   a stop fixed to each said reference plunger at a distance from the respective said cam, the associated movable plate segment being movable against the stop.

2. An apparatus as in claim 1 further comprising a pneumatically operated clamping device for locking each said reference plunger in place relative to the base frame.

3. An apparatus as in claim 1 further comprising a spring which loads each said reference plunger away from the base frame.

4. An apparatus as in claim 1 wherein said base frame is movable toward said component.

5. An apparatus as in claim 1 wherein said at least one movable plate segment comprises a first movable plate segment which is hinged for pivoting movement with respect to said stationary plate segment.

6. An apparatus as in claim 5 further comprising a second movable plate segment which is hinged for pivoting movement with respect to said first plate segment.

7. An apparatus as in claim 6 further comprising a third movable plate segment which is hinged for pivoting movement with respect to said first plate segment.

8. An apparatus as in claim 1 wherein each said reference plunger is rotatable to release the respective projection from contact with the vehicle component.

* * * * *